United States Patent [19]

Corley

[11] Patent Number: 4,544,732

[45] Date of Patent: Oct. 1, 1985

[54] HEAT-CURABLE COMPOSITION

[75] Inventor: Larry S. Corley, Houston, Tex.

[73] Assignee: Shell Oil Company, Houston, Tex.

[21] Appl. No.: 685,505

[22] Filed: Dec. 24, 1984

[51] Int. Cl.[4] ............................................. C08G 59/50
[52] U.S. Cl. ..................................... 528/90; 525/502;
525/529; 528/88
[58] Field of Search ................... 528/88, 90; 525/529, 525/502

[56] References Cited

U.S. PATENT DOCUMENTS

| | | | |
|---|---|---|---|
| 4,230,814 | 10/1980 | Crivello | 528/90 X |
| 4,284,753 | 8/1981 | Hewitt | 525/529 X |
| 4,410,680 | 10/1983 | Brownscombe et al. | 525/529 X |
| 4,503,200 | 3/1985 | Corley | 525/529 X |

*Primary Examiner*—Earl Nielsen

[57] ABSTRACT

Heat-curable compositions exhibiting improved room temperature pot life and reduced viscosity are obtained from compositions comprising (1) a polyepoxide, (2) an aromatic or aliphatic amine, (3) a trihydrocarbyl sulfonium salt, (4) an unsaturated aromatic monomer and (5) a free radical curing agent.

16 Claims, No Drawings

HEAT-CURABLE COMPOSITION

FIELD OF THE INVENTION

The present invention is directed to a heat-curable composition comprising a polyepoxide, an unsaturated aromatic monomer, an amine, a trialkylsulfonium salt of an anion of low nucleophilicity, and a free-radical curing agent.

RELATED APPLICATION

The present application is related to patent application Ser. No. 635,984 filed July 30, 1984, having a common inventor and common assignee.

BACKGROUND OF THE INVENTION

A large number of curing agents are known for epoxy resins, as, for example, amines, anhydrides, mercaptans, etc. Each curing agent has advantages and disadvantages that make it acceptable or unusable for some applications. Also, each curing agent, or combination thereof, may be employed with one or more curing accelerators. Examples include the inorganic and organic metal salts such as lithium chloride and stannous octoate; onium salts such as ammonium chloride, alkyl phosphonium halides, etc; and $BF_3$ complexes.

There is a need to develop curable epoxy resin compositions which cure very rapidly at moderately elevated temperatures yet have very long pot life at room temperature.

Accordingly, it has now been disclosed that certain trialkylsulfonium salts containing anions of low nucleophilicity function as excellent accelerators for the amine cure of epoxy resins. These accelerators are much more thermally latent than prior art accelerators such as $BF_3$ complexes and give a much longer room temperature pot life at equivalent 150° C. gel time. These systems have further been modified with additional monomers to give lower viscosity products.

SUMMARY OF THE INVENTION

The present invention is directed to heat-curable epoxy resin compositions exhibiting improved thermal latency and pot life, which when cured, yield compositions exhibiting improved physical properties. More particularly, the invention provides a heat-curable composition comprising (1) a polyepoxide, (2) a curing amount of an amine, especially an aromatic amine, (3) a catalytic amount of a trihydrocarbyl sulfonium salt, particularly a trialkyl sulfonium salt containing an anion of low nucleophilicity, (4) at least one unsaturated aromatic monomer and (5) a curing amount of a free radical curing agent. These compositions are suitable for use in sheet molding compositions (SMC), in structural applications such as automotive parts, oil well parts (sucker rods), as well as in resin transfer molding (RTM) applications. In addition to the above, these compositions also give reduced viscosity combined with excellent heat resistance, factors which make them leading candidates for a number of pultrusion, filament windings, and resin transfer molding applications.

DESCRIPTION OF THE PREFERRED EMBODIMENTS

It has now been found that heat-curable compositions exhibiting improved thermal latency are obtained from epoxy compositions comprising (1) a polyepoxide, (2) an aromatic (or possibly aliphatic) amine, (3) a trialkyl sulfonium salt, (4) at least one unsaturated aromatic monomer and (5) a curing amount of a free radical curing agent.

Preferably, the composition comprises (1) a glycidyl polyether of a polyhydric phenol, (2) from about 0.5 to about 1.5 chemical equivalents of an aromatic or aliphatic amine based on the glycidyl polyether, (3) a catalytic amount of a trialkyl sulfonium salt, preferably from about 0.001% to about 10% by weight of the glycidyl polyether, (4) at least one unsaturated aromatic monomer and (5) a curing amount of a free radical curing agent, wherein the relative amounts of component (1) to component (4) are about 25 to about 99 percent by weight component (1) to about 75 to about 1 percent by weight component (4).

POLYEPOXIDES

The polyepoxides used to prepare the present compositions comprise those compounds containing at least one vicinal epoxy group; i.e., at least one

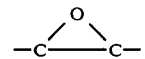

group. These polyepoxides may be saturated or unsaturated, aliphatic, cycloaliphatic, aromatic or heterocyclic and may be substituted if desired with non-interfering substituents such as halogen atoms, hydroxyl groups, ether linkages, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that the disclosure of that patent relative to examples of polyepoxides is incorporated by reference into this specification.

Other suitable polyepoxides are disclosed in U.S. Pat. Nos. 3,356,624, 3,408,219, 3,446,762, and 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 to about 1000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic rings of the phenols have been or are saturated.

Preferred saturated epoxy resins are the hydrogenated resins prepared by the process described in U.S. Pat. No. 3,336,241. Especially preferred are the hydrogenated glycidyl ethers of 2,2-bis(4-hydroxyphenyl)propane, sometimes called the diglycidyl ethers of 2,2-bis(4-cyclohexanol)propane.

Other examples of suitable polyepoxides include the glycidyl ethers of novolac resins, i.e., phenol-aldehyde condensates. Preferred resins of this type are those disclosed in U.S. Pat. No. 2,658,885.

For most applications it is desirable to utilize an epoxy resin which is liquid or semi-liquid under the conditions of application. Accordingly, a blend of a liquid and solid epoxy resin may be employed. For some applications, a solid resin may be employed.

AMINES

Suitable aromatic amines include, among others, methylenedianiline, metaphenylenediamine, 2,4-bis[p-aminobenzyl]aniline, diaminodiphenyl sulfone, 2,4-toluenediamine, 1,3-diamino-2,4-diethyl-6-methylbenzene, 4,4'-oxydianiline, methylenebis(ortho-chloroaniline), 2,6-diaminopyridine, 4-bromo-1,3-diaminobenzene, etc. Aliphatic amines such as bis(4-aminocyclohexyl)methane, 1,8-diamino-p-menthane, or 1,2-diaminocyclohexane may also be used, although aromatic amines constitute a preferred class.

In general, a curing amount of amine is used. Operable amounts range from about 0.5 to about 2.0 chemical equivalents of amine to epoxy resin, with from about 0.75 to 1.25 being preferred. As used herein, a chemical equivalent is the amount which furnishes one amino hydrogen per epoxy group.

TRIALKYLSULFONIUM SALTS

In general, the trialkylsulfonium salts containing anions of low nucleophilicity are preferred. Suitable tri(-hydrocarbyl)sulfonium salts have the following general formula:

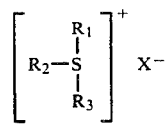

wherein $R_1$, $R_2$, and $R_3$ each represent the same or different alkyl or aryl radicals of from about 1 to about 18 carbon atoms; and X is selected from the group: $BF_4$, $PF_6$, $AsF_6$, $SbF_6$, $CF_3SO_3$, $FSO_3$, $CH_3SO_3$, 2,4,6-trinitrobenzenesulfonate, p-toluenesulfonate, etc. The alkyl or aryl radicals $R_1$, $R_2$ and $R_3$ may contain various substituents such as oxygen, sulfur, halogens, etc.

Suitable triorgano-sulfonium salts include, among others, triethylsulfonium tetrafluoroborate, methyldiphenylsulfonium tetrafluoroborate, ethyldiphenylsulfonium tetrafluoroborate, allyldimethylsulfonium tetrafluoroborate, allyl bis(2-(allyloxy)ethyl)-sulfonium tetrafluoroborate, trimethylsulfonium hexafluorophosphate, ethyl(2-hydroxyethyl)(2-(ethylthio)ethyl)sulfonium tetrafluoroborate, etc.

Briefly, these triorgano-sulfonium salts can be prepared by a number of processes. One process involves reaction of a sulfonium halide with the silver salt of a nonnucleophilic anion such as tetrafluoroborate. In a second process, an alcohol such as allyl alcohol, a sulfide such as dimethyl sulfide, and an acid such as tetrafluoroboric acid containing an anion of low nucleophilicity, are mixed and refluxed. In some cases a thiol may be used instead of a sulfide. Water is removed by azeotropic distillation and entrained in a Dean-Stark trap and the sulfonium salt is left in the pot (in this case, allyldimethylsulfonium tetrafluoroborate). In a third process, a β-hydroxyalkyl sulfide, such as 2,2'-thiodiethanol, is mixed with an acid containing an ion of low nucleophilicity and water is removed by vacuum distillation, leaving a sulfonium salt mixture.

In general, a catalytic amount of triorgano-sulfonium salts is used; i.e. 0.001% to about 10% by weight of the polyepoxide, preferably about 0.3% to about 5% by weight.

MONOMERS

As noted hereinbefore, the epoxy component is blended with up to 75% by weight of one or more unsaturated aromatic monomers.

UNSATURATED AROMATIC MONOMERS

Examples of unsaturated aromatic monomers include the vinyl aromatic monomers such as styrene; alpha-methyl styrene; p-methyl styrene, halo- and nitro-substituted styrenes such as vinyl toluene, chlorostyrene, bromostyrene, nitrostyrene; divinylbenzene, tertiary-butylstyrene; 2-vinylpyridine; and vinylnaphthalene. Styrene is the preferred monomer. Mixtures of unsaturated aromatic monomers may be employed. A preferred mixture comprises styrene and divinylbenzene.

EPOXY MONOMER BLENDS

Usable blends of the polyepoxide and other monomers will range from about 99% polyepoxide and from about 1% to about 75% other monomers as a weight basis. An especially preferred range is from about 95% to about 65% polyepoxide and from about 5% to about 35% other monomers.

FREE RADICAL CURING AGENTS

Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butyl peracetate, dicumyl peroxide, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile), 2,2'-azobisisobutyramide, and the like. Particularly preferred catalysts include the dialkyl peroxides, tertiary alkyl hydroperoxides, alkyl esters of peroxycarboxylic acids and particularly those of the above noted groups which contain no more than 18 carbon atoms per molecule and which have a half-life of at least one hour at 125° C.

An especially useful peroxide is 2,5-dimethyl-2,5-bis(-tertiarybutylperoxy)hexane.

It will be appreciated that the amount of free-radical catalyst (curing agent) will vary over a broad range depending upon the amount of the particular vinyl monomer used, type of peroxide and end-use properties, etc. In general, an effective or curing amount is employed. One skilled in the art would simply adjust the amounts of a particular peroxide to suit his process conditions. Such adjustments are made in one or two runs knowing the temperatures, half-lives, etc.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or cloth and the material formed into the desired object and cured.

The following examples are given to illustrate the preparation of the instant heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a liquid glycidyl polyether of 2,2-bis(4-hydroxyphenyl)propane having an epoxide equivalent weight of 180–195 and an average molecular weight of about 380.

Curing Agent A is a liquid aromatic amine having an amine nitrogen content of 14–16% by weight and a viscosity (25° C.) of 15–35 poises, containing about 30% by weight of o-toluenediamine and 70% by weight of a mixture of polymethylene polyanilines.

The compositions were tested according to the following test procedures:
Heat distortion temperature, °C., ASTM D-648
Tg, °C., dynamic mechanical (Rheometrics)
R.T. Tensile Strength, MPa, ASTM D-638
R.T. Tensile Modulus, MPa, ASTM D-638
R.T. Tensile Elongation, %, ASTM D-638

EXAMPLE 1

Preparation of a BF$_3$-Accelerated Version of Curing Agent A

Curing Agent A (300 g) was heated to 60°–70° C. Boron trifluoride diethyl etherate (4.8 g) was added to the molten Curing Agent A in a fume hood. At this point there was release of copious quantities of diethyl ether vapor; a precipitate formed on the surface of the aromatic amine mixture. The mixture was held at 60°–70° C. with occasional shaking until all the precipitate had dissolved.

EXAMPLE 2

Reaction of 2,2-Thiodiethanol with 48% Aqueous HBF$_4$ 6200 g (50 moles) of 98.5% 2,2'-thiodiethanol was mixed with 4580 g (25 equivalents) of 48% aqueous tetrafluoroboric acid. This mixture was held in a 5-gallon polyethylene reservoir. A glass wiped-film evaporator with an evaporative surface area of 323 cm$^2$ was set up with a Teflon intake tube leading to the polyethylene reservoir; intake rate was controlled by a metering valve. The evaporative surface was held at a temperature of 95°–98° C., while water was pumped from an ice bath to cool the condensation surface. The pressure in the evaporator was lowered to 40–130 Pa and the thiodiethanol-tetrafluoroboric acid mixture was introduced slowly. Water was evaporated from the mixture leaving the desired reaction product as the residue. The intake rate was regulated to give a product output rate of 10–12 mL/min. Karl Fischer titration of the product showed a water level of 2.5% in the product.

EXAMPLE 3

Reaction of 2-(Ethylthio)ethanol with 48% Aqueous HBF$_4$ 6372 g (60 moles) of 2-(ethylthio)ethanol was mixed with 5487 g (30 equivalents) of 48% aqueous tetrafluoroboric acid. This mixture was held in a 5-gallon polyethylene reservoir. A glass wiped-film evaporator was set up under evaporation conditions identical to those in Example 2. The feed intake rate was regulated to give a product output rate of 5–15 mL/min. Karl Fischer titration showed a water level of 2.5% in the product. Neutron activation analysis gave boron levels in the product of 4.2 and 4.3 weight percent. The $^{13}$C NMR spectrum of the product in acetone-d$_6$ was consistent with a structure of

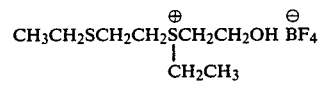

for 72% of the product, with the product apparently containing 2% of 2-(ethylthio)ethanol and 26% of other components of unknown structure.

EXAMPLE 4

Preparation of Crude Allyldimethylsulfonium Tetrafluoroborate

Into a 3-neck 5-liter flask were weighed 1161.6 g (20 moles) of allyl alcohol, 950 g (15.3 moles) of dimethyl sulfide, and 1829 g (10 moles) of 48% aqueous tetrafluoroboric acid. The flask was attached to a large (1.5 liter) capacity Dean-Stark trap (initially filled with dimethyl sulfide) which was attached to a condenser. Reflux was started and an aqueous phase began to accumulate at the bottom of the Dean-Stark trap, displacing dimethyl sulfide back into the reaction mixture. Reflux was continued for six days. At the end of this period, the rate of accumulation of aqueous phase had become very small. The aqueous phase was drained into a tared bottle and weighed; the net weight of the aqueous phase was 1136.7 g. Excess dimethyl sulfide and allyl alcohol were allowed to distill at atmospheric pressure into the Dean-Stark trap until the temperature in the flask had reached 100° C. At this point, the flask was connected to a dry ice trap and vacuum was applied. The mixture in the flask was evaporated at 70° C. under magnetic stirring for one hour, with the pressure decreasing to a final value of 200 Pa. The yield of nonvolatile product was 1952 g. The nonvolatile product was a viscous liquid containing a small amount of crystals. It showed no signs of further crystallization on standing at room temperature.

EXAMPLE 5

Use of Sulfonium Salts to Accelerate Aromatic Amine Cure of Epoxy Resins Diluted with Styrenic Monomers Epoxy Resin A (100 parts), Curing Agent A (25 parts), and monomers and catalysts in the proportions listed in Table 1 were combined at room temperature in polyethylene beakers and mixed thoroughly with Jiffy mixers. (The curing agent used in experiment 9 was the product of Example 1, Curing Agent A preblended with $BF_3$ diethyl etherate catalyst.)

A portion of each mixture was poured into a mold made of two glass plates held ⅛" (3.2 mm) apart with a polytetrafluoroethylene spacer to make a sheet casting. Another portion of each mixture was poured into two aluminum molds containing a linear cavity ½" (12.7 mm) square to form bar castings. The sheet and bar molds were placed in an oven and held for two hours at 80° C. and two hours at 150° C. The sheet and bar castings were then removed from the molds and tested for mechanical properties. Mechanical properties are given in Table 1.

A third portion of each mixture was poured into a Ubbelohde viscometer which in turn was placed in a constant-temperature bath set at 25° C. Viscosity was determined periodically for each mixture. From the viscosity data was determined for each mixture a "pot life", or the amount of time required for the viscosity to double from its initial value.

From Table 1 one can see that all three sulfonium salts used (Catalyst 1, Catalyst 2, and Catalyst 3) were considerably more latent as accelerators than was the control accelerator, $BF_3$ diethyl etherate (experiment 9). The 25° C. pot life of the system accelerated with $BF_3$ diethyl etherate was by far the shortest of any system tested, although this system was in the range of the other accelerated systems in 150° C. gel time. In the accelerated systems, progressive replacement of the styrene with divinylbenzene did not change the gel time greatly.

All of the diluted systems were depressed in heat distortion temperature (HDT) and glass transition temperature (Tg) in comparison with the undiluted system, with substitution of divinylbenzene for styrene only marginally effective for HDT recovery. Room temperature tensile properties of all of the systems were comparable.

TABLE 1

Use of Sulfonium Salts to Accelerate Aromatic Amine Cure of Epoxy Resin Diluted with Styrenic Monomers

| Run # | Styrene, phr | Divinyl-benzene, phr | Catalysts, phr (a) | 150° C. Gel Time, Sec. | Time (min) - 25° C. Ubbelohde Viscosity (mPa · s) | 25° C. Pot Life hr. | HDT, 264 psi, °C. | Tg, Rheometrics, °C. | R.T. TENSILE Strength, MPa | R.T. TENSILE Modulus, MPa | R.T. TENSILE Elongation % |
|---|---|---|---|---|---|---|---|---|---|---|---|
| 1 | | | Cat 3 (0.7) | 90 | | | 148,149 | 164 | 67 | 2910 | 3.4 |
| 2 | 12 | | Cat 3 (0.7) Lupersol 101 (0.4) | 96 | 60-1019,120-1174, 240-1484,360-2029, 390-2422 | 4.33 | 116,122 | 156 | 75 | 2870 | 5.2 |
| 3A | 24 | | Cat 3 (0.7) Lupersol 101 (0.4) | 90 | | | 121,121 | 150 | 76 | 3050 | 5.6 |
| 3B | 48 | | Cat 3 (0.7) Lupersol 101 (0.4) | 95 | | | 110,117 | 150 | 75 | 3180 | 5.1 |
| 4 | 12 | | Lupersol 101 (0.4) | 420 | 95-688,180-688, 315-818,435-955 | >10 | 133,133 | 154 | 79 | 2890 | 5.3 |
| 5 | 6 | 6 | Cat 3 (0.7) Lupersol 101 (0.4) | 86 | | | 119,121 | 151 | 73 | 2960 | 4.1 |
| 6 | | 12 | Cat 3 (0.7) Lupersol 101 (0.4) | 87 | 60-1465,120-1745, 240-2271,360-3232, 390-3967 | 4.83 | 125,128 | 153 | 85 | 3470 | 4.9 |
| 7 | 12 | | Cat 1 (1.0) Lupersol 101 (0.4) | 112 | 60-918,120-1067, 240-1370,360-1890, 390-2189 | 4.41 | 126,127 | 150 | 78 | 3520 | 4.2 |
| 8 | 12 | | Cat 2 (1.0) Lupersol 101 (0.4) | 87 | 60-1016,120-1288, 240-1832,360-2852, 390-3456 | 3.83 | 125,126 | 156 | 84 | 3140 | 6.6 |
| 9 | 12 | | $BF_3O(C_2H_5)_2$ (0.4) | | 92-1177,180-2677 | ~2.0 | 125,126 | 146 | 78 | 3580 | 4.5 |

TABLE 1-continued

Use of Sulfonium Salts to Accelerate Aromatic Amine Cure of Epoxy Resin Diluted with Styrenic Monomers

| Run # | Styrene, phr | Divinyl-benzene, phr | Catalysts, phr (a) | 150° C. Gel Time, Sec. | Time (min) - 25° C. Ubbelohde Viscosity (mPa·s) | 25° C. Pot Life hr. | HDT, 264 psi, °C. | Tg, Rheometrics, °C. | R.T. TENSILE Strength, MPa | Modulus, MPa | Elongation % |
|---|---|---|---|---|---|---|---|---|---|---|---|
| | | | Lupersol 101 (0.4) | 103 | | | | | | | |

(a) Catalyst 1 = product of Example 2
Catalyst 2 = product of Example 3
Catalyst 3 = product of Example 4
(crude allyldimethylsulfonium tetrafluoroborate)

EXAMPLE 6

Use of Sulfonium Salts to Accelerate Cure with 1,8-Diamino-p-Menthane of Epoxy Resins Diluted with Styrenic Monomers The following materials were combined in the proportions indicated at room temperature in polyethylene beakers and mechanically mixed thoroughly with Jiffy mixers:

100 parts Epoxy Resin A
5 parts Styrene
5 parts Divinylbenzene (55% grade, American Hoechst)
0.4 parts Lupersol 101 (2,5-bis(t-butylperoxy)-2,5-dimethylhexane)
22.6 parts 1,8-Diamino-p-menthane
Catalyst at level indicated in Table 2

A portion of each mixture was poured into two aluminum molds containing a linear cavity ½" (12.7 mm) square to form bar castings. The bar molds were placed in an oven and held for two hours at 80° C., one hour at 150° C. and one hour at 170° C. The bar castings were then removed from the molds and tested for heat distortion temperature (HDT). HDT values are listed in Table 2.

A second portion of each mixture was poured into a Ubbelohde viscometer which in turn was placed in a constant-temperature bath set at 25° C. Viscosity was determined periodically for each mixture. From the viscosity data was determined for each mixture a "pot life", or the amount of time required for the viscosity to double from its initial value.

From Table 2 one can see that the sulfonium salt Catalyst 3 (crude allyldimethylsulfonium tetrafluoroborate) was a considerably more latent accelerator for the cure than was the control accelerator, aqueous HBF$_4$. Experiment #4 in Table 2, using Catalyst 3 as an accelerator, had a 25° C. pot life of 1.8 hours and a 150° C. gel time of 280 seconds. The control experiment #1, in which aqueous HBF$_4$ was used as an accelerator, had a more sluggish 150° C. gel time (350 seconds) but a shorter 25° C. pot life (0.9 hours).

TABLE 2

Use of Sulfonium Salts to Accelerate Aliphatic Amine Cure of Epoxy Resins Diluted with Styrenic Monomers

| Run # | Catalyst, phr (a) | 150° C. Gel Time, Sec. | 171° C. Gel Time, Sec. | Time (min) - 25° C. Ubbelohde Viscosity (mPa·s) | 25° C. Pot Life, hr. | HDT, 264 psi, °C. |
|---|---|---|---|---|---|---|
| 11 | HBF$_4$ (0.45) H$_2$O (0.45) | 350 | 175 | 110–1833, 213–6789 | 0.9 | 112,115 |
| 12 | | 1500 | 582 | 95–497, 180–612, 335–993 | 4.0 | 124,125 |
| 13 | Cat 3 (1) | 375 | 212 | 93–578, 190–968, 345–2760 | 2.5 | 116,117 |
| 14 | Cat 3 (2) | 280 | 96 | 97–721, 190–1373, 330–5194 | 1.8 | 93,95 |
| 15 | Cat 3 (4) | 205 | 72 | 81–815, 185–2164, 335–13117 | 1.3 | 78,81 |

(a) Catalyst 3 = product of Example 4
(crude allyldimethylsulfonium tetrafluoroborate)

What is claimed is:

1. A curable composition comprising (1) a polyepoxide, (2) at least one aromatic or aliphatic amine, (3) a catalytic amount of a trihydrocarbyl sulfonium salt, (4) at least one unsaturated aromatic monomer and (5) a curing amount of a free radical curing agent.

2. The composition of claim 1 wherein the polyepoxide is a glycidyl polyether of a polyhydric phenol.

3. The composition of claim 2 wherein the polyhydric phenol is 2,2-bis(4-hydroxyphenyl)propane.

4. The composition of claim 1 wherein the trihydrocarbyl sulfonium salt is a trialkyl sulfonium salt.

5. The composition of claim 4 wherein the trialkyl sulfonium salt is used in an amount from about 0.001% to about 10% by weight of the polyepoxide.

6. The composition of claim 1 wherein the trihydrocarbyl sulfonium salt is a mixture prepared by the condensation of 2,2'-thiodiethanol with tetrafluoroboric acid.

7. The composition of claim 1 wherein the trihydrocarbyl sulfonium salt is ethyl(2-hydroxyethyl)(2-(ethylthio)ethyl)sulfonium tetrafluoroborate.

8. The composition of claim 1 wherein the aromatic amine is 4,4'-methylenedianiline.

9. The composition of claim 1 wherein the unsaturated aromatic monomer is selected from the group consisting of styrene, alpha-methylstyrene, vinyl toluene, chlorostyrene, bromostyrene, nitrostyrene, divinylbenzene, tertiary-butylstyrene, 2-vinylpyridine, vinylnaphthalene and mixtures thereof.

10. The composition of claim 9 wherein the unsaturated aromatic monomer is styrene.

11. The composition of claim 9 wherein the unsaturated aromatic monomer is a mixture of styrene and divinylbenzene.

12. The composition of claim 1 wherein the free-radical curing agent is a peroxide.

13. The composition of claim 12 wherein the peroxide is an organic peroxide.

14. The composition of claim 1 wherein the relative amount of polyepoxide to unsaturated aromatic monomer is about 99 to about 25 percent by weight polyepoxide and about 1 to about 75 percent by weight unsaturated aromatic monomer.

15. The composition of claim 14 wherein the amount of amine is about 0.5 to about 1.5 chemical equivalents based on the polyepoxide.

16. The composition of claim 15 wherein the amount of trihydrocarbyl sulfonium salt is about 0.01 to about 10 percent by weight based on the polyepoxide.

* * * * *